(12) United States Patent
Anker et al.

(10) Patent No.: US 7,675,869 B1
(45) Date of Patent: Mar. 9, 2010

(54) APPARATUS AND METHOD FOR MASTER ELECTION AND TOPOLOGY DISCOVERY IN AN ETHERNET NETWORK

(75) Inventors: Tal Anker, Modiin (IL); Gil Siso, Tel-Aviv (IL); Anat Cohen, Hod Hasharon (IL); Gil Shevach, Herzliya (IL)

(73) Assignee: Marvell International Limited, Hamilton (BM)

(*) Notice: Subject to any disclaimer, the term of this patent is extended or adjusted under 35 U.S.C. 154(b) by 1420 days.

(21) Appl. No.: 10/926,946

(22) Filed: Aug. 27, 2004

Related U.S. Application Data

(63) Continuation of application No. 10/886,117, filed on Jul. 6, 2004, now abandoned.

(51) Int. Cl.
*H04L 12/28* (2006.01)
(52) U.S. Cl. .................. 370/255; 370/389
(58) Field of Classification Search .......... 370/254, 370/255, 258, 389, 392
See application file for complete search history.

(56) References Cited

U.S. PATENT DOCUMENTS

| | | | |
|---|---|---|---|
| 5,485,578 A * | 1/1996 | Sweazey | 709/224 |
| 6,502,160 B1 | 12/2002 | Kim et al. | 710/317 |
| 6,510,141 B1 * | 1/2003 | Ramfelt et al. | 370/254 |
| 6,516,345 B1 | 2/2003 | Kracht | 709/220 |
| 6,594,776 B1 | 7/2003 | Karighattam et al. | 714/4 |
| 6,643,269 B1 * | 11/2003 | Fan et al. | 370/254 |
| 6,654,796 B1 | 11/2003 | Slater et al. | 709/220 |
| 6,654,802 B1 | 11/2003 | Oliva et al. | 709/224 |
| 6,876,643 B1 * | 4/2005 | Aggarwal et al. | 370/338 |
| 6,981,025 B1 * | 12/2005 | Frazier et al. | 709/209 |
| 7,054,951 B1 * | 5/2006 | Kao et al. | 709/242 |
| 2003/0165119 A1 * | 9/2003 | Hsu et al. | 370/258 |
| 2003/0169734 A1 | 9/2003 | Lu et al. | 370/386 |
| 2003/0227914 A1 | 12/2003 | Nguyen | 370/386 |
| 2004/0032856 A1 * | 2/2004 | Sandstrom | 370/351 |
| 2004/0090943 A1 * | 5/2004 | da Costa et al. | 370/338 |
| 2006/0212551 A1 * | 9/2006 | Kao et al. | 709/220 |

\* cited by examiner

Primary Examiner—Hong Cho

(57) ABSTRACT

An apparatus, method and computer memory for electing a master unit from multiple candidate units on a ring or chain topology network is provided. Master proposal data packets are transmitted onto a plurality of stacking links. At least one message data packet is received on the one candidate unit. A candidate unit is elected as the master unit if it receives message data packets corresponding to the transmitted master proposal data packets.

93 Claims, 13 Drawing Sheets

| 0 1 2 3 4 5 6 7 8 9 10 11 12 13 14 15 16 17 18 9 20 21 22 23 24 25 26 27 28 29 30 31 |
|---|
| Message Type (4 - bytes) |
| Reserved (31 - bits) / User |
| Up Time (4 - bytes) |
| User_Defined_Unit_ID (4 - bytes) |
| HW_Unique_ID (4 - bytes) |
| HW_Unique_ID (4 - bytes) \| LoopBack (1 - bytes) \| IsMasterEnable (1 byte) |
| Sequence number (4 - bytes) |
| TTL (4 - bytes) |
| Topology list length (4 - bytes) |
| Reserved (31 - bits) / User |
| Up Time (4 - bytes) |
| User_Defined_Unit_ID (4 - bytes) |
| HW_Unique_ID (4 - bytes) |
| HW_Unique_ID (4 - bytes) \| Marshal size (2 - bytes) |
| Marshal size (2 - bytes) \| Topology byte stream – (size in bytes) |
| Topology byte stream - size bytes |
| ........................ |
| Reserved (31 - bits) / User |
| Up Time (4 - bytes) |
| User_Defined_Unit_ID (4 - bytes) |
| HW_Unique_ID (4 - bytes) |
| HW_Unique_ID (4 - bytes) \| Topology size (2 - bytes) |
| Topology size (2 - bytes) \| Topology byte stream – (size in bytes) |
| Topology byte stream – (size in bytes) |

APPARATUS AND METHOD FOR MASTER ELECTION AND TOPOLOGY DISCOVERY IN AN ETHERNET NETWORK

REFERENCE TO FIRST APPLICATION

The present application is a continuation of U.S. patent application Ser. No. 10/886,117, filed on Jul. 6, 2004.

BACKGROUND OF THE INVENTION

1. Field of the Invention

The present invention relates to network devices, and more particularly to network devices that determine the physical topology of a distributed network device and perform master election in a stacked switch network.

2. Description of the Related Art

Switching is a technology that alleviates congestion in networks by reducing traffic and increasing bandwidth. A switch manages and regulates the network traffic by filtering message connections point-to-point between stations communicating with each other, providing in effect a dedicated connection. Switching algorithms can be performed by processors, application-specific integrated circuits ("ASICs") and the like.

Ethernet is a term of art that refers to network architecture that meets the IEEE 802.3 family of protocols. An Ethernet switch has only a limited number of ports and manages network traffic among a limited number of nodes or of ports and manages network traffic among a limited number of nodes or segments. For an Ethernet switch system to provide more ports, the system frequently must combine, or "stack", two or more Ethernet switches. Stacking provides interconnections between the Ethernet switches to enable coordinated operation of the combined system and provides more switching capability for the network.

Stacks of switches can be arranged physically in different ways, for example by shared bus, switching fabric, ring-bus and interleaved interconnection structures. Typically, one of the units in a stack acts as a stack master, while all other units act as slaves. Network managers can manage the entire stack remotely, as one switch box, via the stack master.

A crucial task in a switched Ethernet environment is so-called "master election," that is the selection of a stack master. Conventionally, a user-defined master election priority is used to define which switch will become master in the first instance, which switch would become master if the first master fails and so on until one switch is left in the stack. Generally, the configuration files are unified for all the switches in a stack. If the master switch fails, the newly elected master will have the configuration for the entire stack. To unify the switch configuration, each switch in the stack can be given an arbitrary identification number such as a media access control ("mac") address which is a static identifier which cannot be changed by a user. Another type of arbitrary identification is a number set by a user via management software or by a physical knob or button on the unit itself.

Existing master election and configuration unification processes do not handle multiple faults well. For example, in a ring topology, if two ring faults occur, the stack is broken into two stacks each with a master of its own. After reconnecting the ring, without rebooting several switches in the stack, the master election process might not be able to resolve a new master. In addition, rebooting switches can take several minutes, which could affect network communications adversely.

In some cases the units will not reconnect back to a ring topology. FIG. 7 illustrates a ring topology broken in two places—between unit 701 and unit 702 between master unit 700 and unit 704. Here, the two link failures cause two chain topologies to be formed.

Another crucial task is the discovery of the network-level topology of a given network. Every architecture has a unique topology, and the effective topology can change because the physical arrangement of nodes may change, I/O nodes can intervene, and network devices can fail, to name a few.

SUMMARY

It is an object of the present invention to provide a master election protocol which elects a master unit from a ring or chain topology network.

It is another object of the present invention to perform topology discovery of the network during master election process. In accordance with one embodiment of the present invention there is provided a method for electing a master unit from a plurality of candidate units on a ring or chain topology network. The method includes transmitting from a candidate unit master proposal data packets onto stacking links communicatively coupled to the network. The method also includes receiving on the candidate unit at least one message data packet. The candidate unit is elected as the master unit if it receives message data packets corresponding to the transmitted master proposal data packets.

In accordance with another embodiment of the present invention a network device on a ring or chain topology network is provided. The network device includes a packet processor and a control unit. The packet processor transmits master proposal data packets onto stacking links communicatively coupled to the network. The packet processor can also receive message data packets. The control unit controls the packet processor and elects the network device as a master unit if the packet processor receives message data packets corresponding to the transmitted master proposal data packets.

In accordance with yet another embodiment of the present invention an apparatus for electing a master unit from a plurality of candidate units on a ring or chain topology network is provided. Means are included for transmitting from a candidate unit master proposal data packets onto stacking links communicatively coupled to the network. Also included are means for receiving on the candidate unit a message data packet. Means are included for electing the candidate unit as the master unit if the candidate unit receives message data packets corresponding to the transmitted master proposal data packets.

In another embodiment of the present invention, computer program for execution on a processor for electing a master unit from a plurality of candidate units on a ring or chain topology network is provided. The computer program includes code for transmitting from one of the candidate units a plurality of master proposal data packets onto a plurality of stacking links communicatively coupled to the network. The program also includes code for receiving on the one candidate unit at least one message data packet. Code for electing the candidate unit as the master unit if the candidate unit receives message data packets corresponding to the transmitted master proposal data packets is also included.

In accordance with yet another embodiment of the present invention a system of stacked units on a ring or chain topology network is provided. A candidate unit transmits a plurality of master proposal data packets onto stacking links communicatively coupled to the network. The candidate unit can also receive message data packets and elects itself as a master unit if it receives message data packets corresponding to the transmitted master proposal data packets.

Another embodiment of the present invention provides a packet for use in a master election protocol. The packet includes a message type field containing a message type. The message type can be a master proposal message type, a topology information message type and/or a master identifier type. The packet also includes a unit identifier field containing a unit identifier of a unit on a ring or chain topology network. In addition, a message sequence number field identifying a message sequence number is included. Also included is a message sequence field containing a message sequence number.

In accordance with yet another embodiment of the present invention a system of stacked units on a ring or chain topology network is provided. The system includes means for transmitting master proposal data packets onto stacking links communicatively coupled to the network. The system further includes means for receiving at least one message data packet. Means are provided for electing a master unit if the means for transmitting receives message data packets corresponding to the transmitted master proposal data packets.

BRIEF DESCRIPTION OF DRAWINGS

FIG. 5 illustrates an exemplary data packet format of the message fields corresponding to a master election protocol and topology update message.

DETAILED DESCRIPTION OF THE INVENTION

The particular algorithms discussed herein can be realized in software recorded on a computer-readable storage medium. Such algorithms could also be implemented by hardware, such as for example application specific integrated circuits (ASIC), programmable logic arrays (PLA), special purpose integrated circuits (ICs), digital signal processors (DSPs) or any other suitable logic devices, the constructions of which are all well known.

For the sake of clarity, the algorithms of the present invention will be explained in part through the use of a pseudo code that resembles loosely C code. Such pseudo code will be readily understandable to those skilled in the art. As will be readily appreciated, any suitable programming language may be used. The routines described below can be run concurrently or sequentially.

Figure 1A:
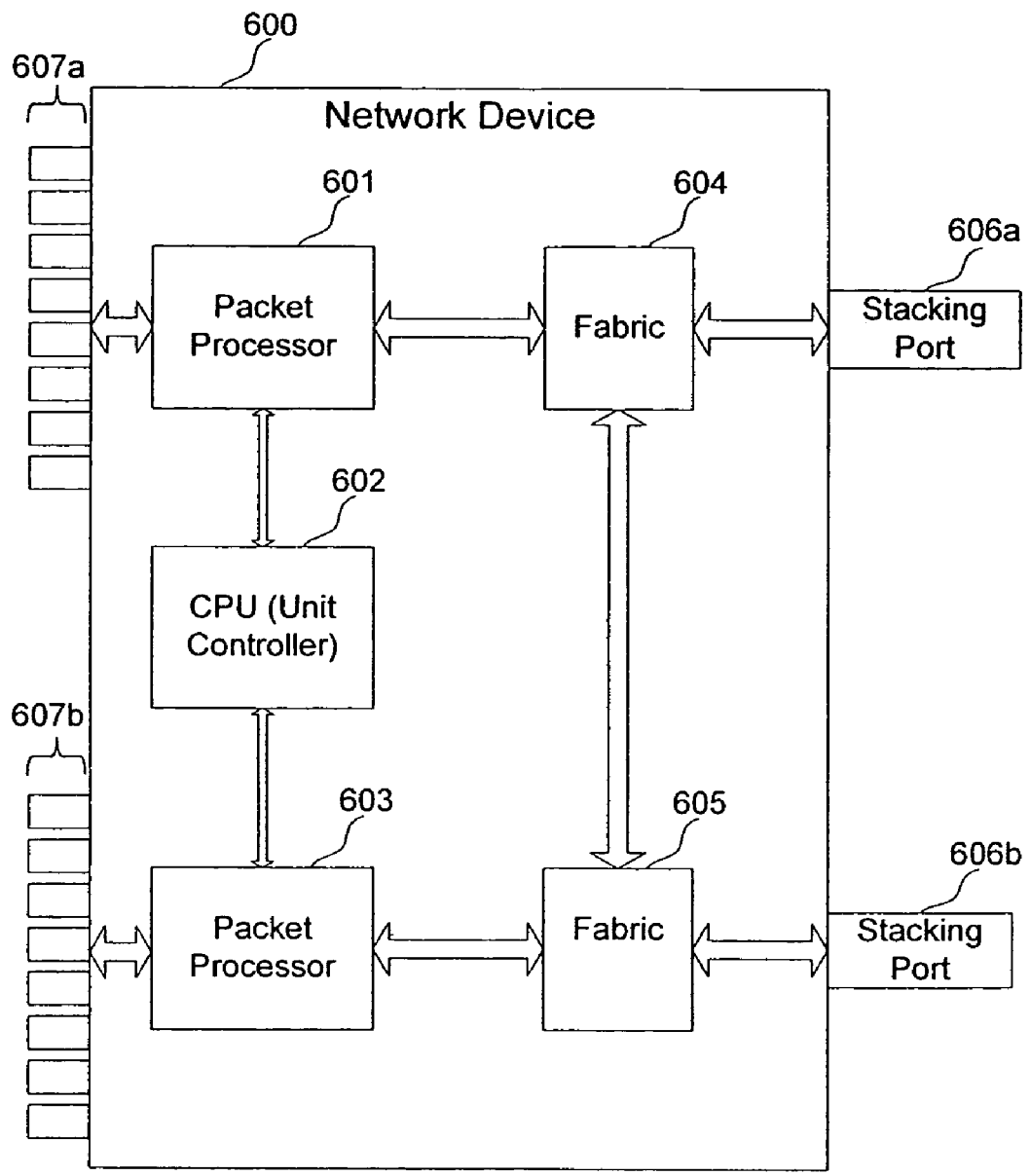
FIG. 1A is a block diagram of an embodiment of the present invention.

FIG. 1A is a block diagram of a stack unit 1 in accordance with the present invention. Fabric adaptors 604 and 605 interconnect packet processors 601 and 603, respectively into a larger stacked system via stacking ports 606a and 606b—assisted by a programmable CPU 602. Packet processors 601 and 603 are also communicatively coupled to a network via network ports 607a and 607b. Common system components such as memory or flash are not shown.

Figure 1B:
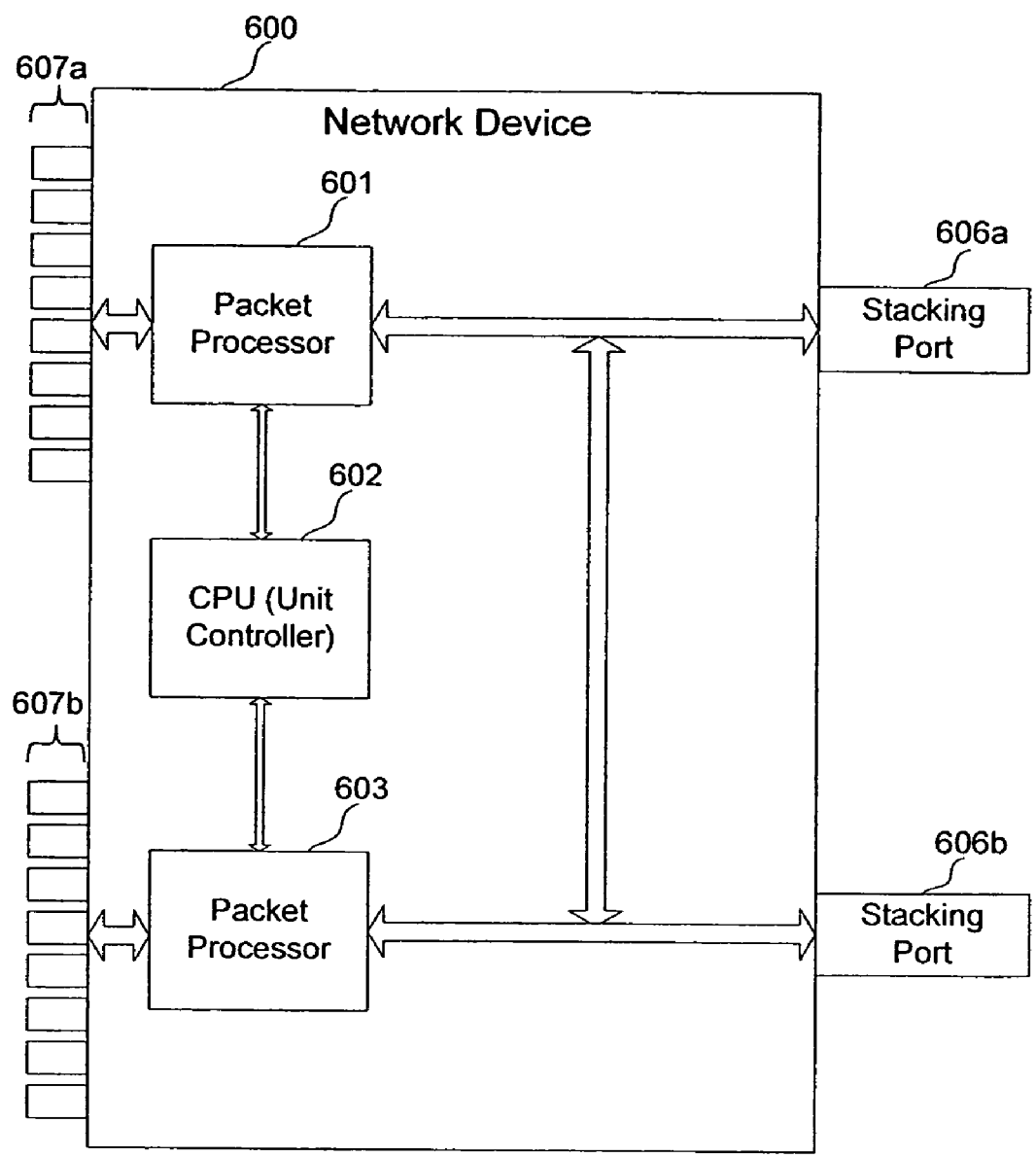
FIG. 1B is a block diagram of another embodiment of the present invention, which does not use fabric adaptors.

FIG. 1B is a block diagram of another embodiment of stack unit 1 in accordance with the present invention. In this embodiment, data can be transmitted from the packet processors to other stacked units via stacking ports 606a and 606b. Instead of fabric adaptors any interface hardware which provides the physical interconnection architecture that redirects the data to and from packet processors 601 and 603 and stacking ports 606a and 606b, respectively, and between stacking ports 606a and 606b can be used. As in the embodiment discussed above with respect to FIG. 1A, a programmable CPU controls the packet processors 601 and 603 and common system components such as memory or flash are not shown. In addition, packet processors 601 and 603 are communicatively coupled to a network via network ports 607a and 607b.

A stack of switch units preferably has at any given time a single active master which represents the stack for other units on the network, and through which the stack can be managed, updated and synchronized. In order to support switch availability and to sustain faults, there can be many potential master units. The present invention elects a master from among the potential master units. Every potential master unit that was not elected as the active master acts as a slave while the master is operational. Thus, at any time the stack is comprised of a single active master and a set of slaves, all or some of which slaves may be back-up masters. Back-up masters can also be referred to as candidate master units.

Ports on a device can be accessed (or managed) remotely by a CPU or through the master as if they were the local ports of the master. In other words, the master and another node see the entire stack as one virtual switch. In addition, a master configures and monitors all ports of all slave units. A slave unit also allows the master to control and manage its resources. Slave units can also be configured to continuously monitor the existence and operation of other units in the stack, including the stack master. If another slave has failed, the monitoring slave can signal to the entire stack (or just the master) that a topology change has occurred. If the master unit has failed, in addition to signaling the change in topology, one of the slave units will assume the stack master role.

Every unit that detects a stack link change (e.g., a link change or a neighbor unit status change) can be adapted to trigger locally a master-election and topology discovery process. This causes topology change notification messages to be sent to neighbors which in turn trigger at the receiving units a new election/topology discovery process.

Messages need not be transmitted to the entire stack. Nor is it a requirement that messages must be sent to the master device. The device could be configured to trigger itself only.

A unit can also perform network topology discovery during the master election process. The protocol which performs the network topology and master election process is hereinafter referred to as master election protocol or master election algorithm. The master election protocol is a set of communication rules the units in the switched network use when they send messages back and forth. The units must recognize the types of messages it receives and adhere to the protocol. The master election protocol allows a stacked network topology detection and election of master units to occur with minimal impact on operation in the event of unit failure, inter-unit link loss, or other events such as hot-insertion or removal of a unit from the stack.

Various triggers initiate the master election protocol. The most common trigger is a change in the stack's topology.

Such changes can be detected in various ways. For example, units can be configured to employ a "heartbeat" mechanism which expects periodic heartbeat packets from one or more units. If many heartbeat packets are lost, then the master election is triggered.

Failure of a unit, hot extraction of a unit, or any stacking link failure cause topology changes, which will be noticed and kept by the master of the stack. Such topology changes can also be noticed by neighboring units. These events could change the topology of a stack from, for instance a ring topology to a chain topology. Moreover, these events could cause a chain topology to partition into two parts, a chain of a set of slave units and a smaller stack. In all these events, the master will detect the topology change and will continue to operate the stack normally; it will set all ports of any failed unit(s) to a down state—but will keep the port configuration of any failed unit. In addition, service to the master and the slave units that remained connected will not be interrupted.

A unit can also be configured to initiate the master election process by sending a master election protocol message indicating that a master election protocol should be performed upon receiving the message. If a unit that is not in the state of performing master election protocol receives such a master election protocol message it will start the master election process and immediately process the message. Such an initiating message can be sent for instance by units that are new to the stack or have been restarted can trigger the master election process as well. This allows a topology changes such as a downed stack link event to propagate and trigger a master election process.

FIG. 5 illustrates a data packet format of the message fields corresponding to a master election protocol and topology update message. The particular fields will be described in the discussion that follows. Other data packet formats and message field sizes can be used and still be within the scope of the invention.

Each stackable unit has a unique unit identifier ("unit ID" or "UI" or "Source Unit Id"). In addition to uniquely identifying the unit within a stack, the UI is used for management purposes and inter-stack unit communications during the master election process. The master election protocol compares the UIs of multiple units and selects the unit with the lowest UI. UI is used in the master election process to determine which unit will become the master unit. UI is defined as the concatenation of several fields:

[User_Pref:UpTime:User_Defined_Unit_ID:HW_Unique_ID] (1)

The notion of which unit's UI is lower is defined as "$UI_x < UI_y$," where x and y identify different units within the stack. It should be noted that other fields could be used to define UI. In addition, any combination of such fields could be used.

Figure 2A:
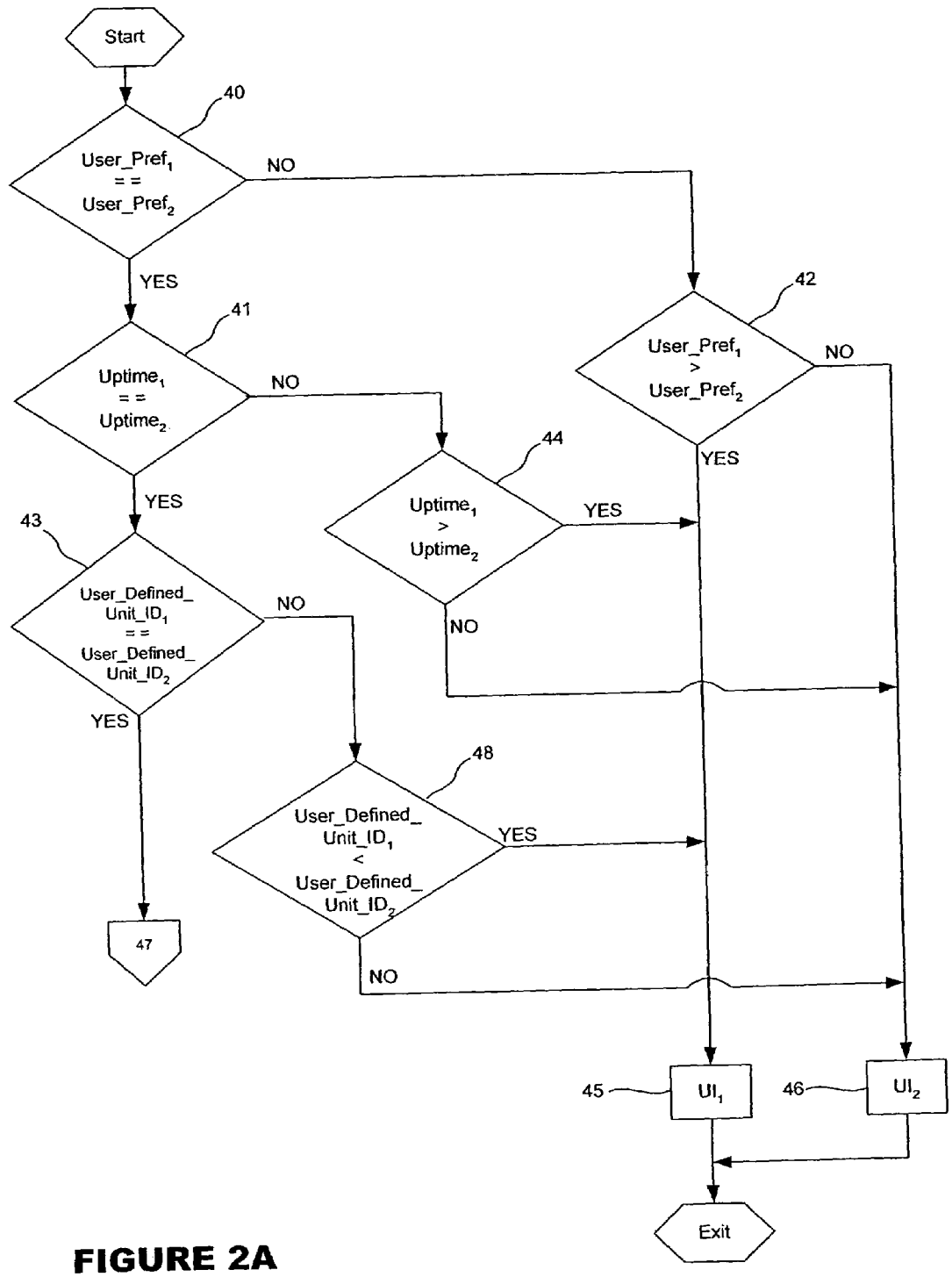
FIGS. 2A and 2B provide a flowchart of a routine for comparing multiple units in a stack and determining the unit having the lower unit identifier.
Figure 2B:
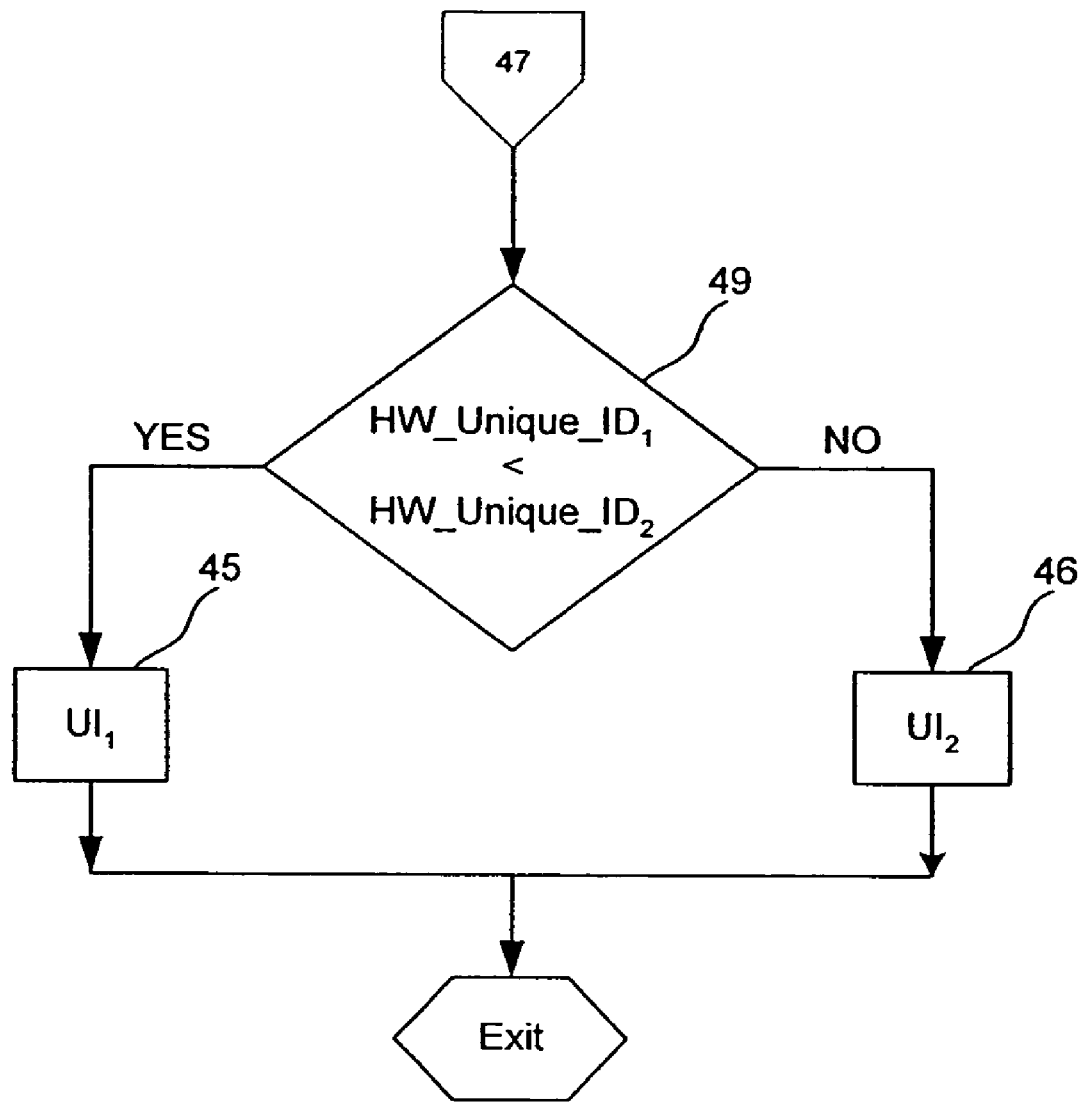

FIGS. 2A and 2B provide a flowchart illustrating a routine for comparing two units in a stack, $UI_1$ and $UI_2$ and determining the unit having the lower UI. User_Pref is a variable which determines whether all the other fields in definition (1) should be overridden. The value of User_Pref variable is set by a user. Step 40 determines whether two user preference variables are equal. If not, the unit with the greater User_Pref is determined to have the lower UI, as shown in steps 42, 45 and 46.

UpTime is a variable which stores the time each unit has been up (i.e., a unit's "age"). If a determination is made in step 40 that two units have the same User_Pref, their UpTimes are compared as shown in step 41. Situations could arise where UpTimes of multiple units are the same, such as when the entire stack is rebooted or when multiple units are inserted into the stack within a predefined interval. If the UpTimes are different, then the unit with the longest UpTime is determined to have the lower UI as shown in step 44, 45 and 46.

User_Defined_Unit_ID is a hardware identifier assigned by a user. Preferably, the User_Defined_Unit_ID is a number between 1 and the maximum number of units in a stack which can be set by the user via management software or by a physical knob or button on the unit itself. If a determination is made in step 41 that the up times are equal, then step 43 determines whether the units User_Defined_Unit_IDs are the same. If not, then the unit with the lowest User_Defined_Unit_ID will be considered to have the lowest UI number, as shown in steps 45, 46 and 48.

HW_Unique_ID is a hardware address that uniquely identifies each unit in the stack and is used to select the unit with the lowest UI in the event units with the same User_Defined_Unit_ID exist. HW_Unique_ID can be set at the manufacturer's facility in hardware as a media access control ("mac") address and is a fixed identifier which cannot be changed by a user. In the event step 43 determines that User_Defined_Unit_ID duplications exist, steps 45, 46 and 49 (FIG. 1B) select the unit with the lowest HW_Unique_ID. Thus, if an operator has configured two stack units with the same User_Defined_Unit_ID, the HW_Unique_ID is used to determine the unit with the lowest UI. Optionally, the unit with the higher UI can be eliminated from the stack entirely.

The steps discussed above with respect to FIGS. 2A and 2B are shown in the pseudo code that follows:

$(UI_1 < UI_2)$ iff
/* User preference overrides other variables */
$(User\_Pref_1 > User\_Pref_2)$ or
/* Longer UpTime is preferable */
$((User\_Pref_1 == User\_Pref_2)$ and $(UpTime_1 > UpTime_2))$ or
/* If all the above are equal then select the lower physical unit ID */
$((User\_Pref_1 == User\_Pref_2)$ and $(UpTime_1 == UpTime_2)$ and $(User\_Defined\_Unit\_ID_1 < User\_Defined\_Unit\_ID_2)$ or
/* If all the above are equal then and duplicate UI then select the lower unique hardware ID */
$((User\_Pref_1 == User\_Pref_2)$ and $(UpTime_1 == UpTime_2)$ and $(User\_Defined\_Unit\_ID_1 == User\_Defined\_Unit\_ID_2)$ and $(HW\_Unique\_ID_1 < HW\_Unique\_ID_2)))$ For purposes of the present invention, UI can be alternatively an arbitrary identifier such as a hardware unique identifier, a physical unit id or a user preference variable, or concatenation of any of them. However, as shown above in the preferred embodiment, the UI is a combination of arbitrary and dynamic variables, where the dynamic variable is a unit's age, which of course increases over time.

Master election protocol message processing in accordance with the present invention will now be explained in more detail. The master election protocol sends different types of messages back and forth. Each unit must recognize the type of master election protocol message it receives. In the discussion that follows, any reference to My Message refers to any of the messages transmitted by a unit proposing to be a stack master (i.e., "proposing unit") and stored in an array called MasterElectionPacket. A message from a unit proposing that it be a master unit is a master proposal packet or MasterProposalPacket type message. Thus MasterProposalPackets are stored in the MasterElectionPacket array. Data that is "stored" is data stored on the proposing unit, which is compare to data extracted from a message received by the proposing unit.

Referring back to FIG. 5, not all units are required to propose themselves as master units. A master enable field in the master proposal message can be set to indicate whether a unit (e.g., the source unit) is master enabled. If it is, then the unit may be elected as the stack master. Otherwise, it is merely notifying its neighbors of the triggering event. The source unit's neighbors can then (if enabled) initiate the master election process, proposing themselves as master units.

A process for initiating a master election process will now be described. A message of type MasterProposalPacket is a packet used to transmit a unit's proposal to become master of the stack and includes the proposing unit's UI (as defined above in definition (1)) and any topology information encoded as type length value (TLV) fields. Each element in the list of topology information is an opaque structure that the unit is responsible for building, so that it can be put on the MasterProposalPacket. This structure contains the relevant information for the path calculation from which the configuration of stacking switching fabric will be derived. The proposing unit sends onto each of its stacking links MasterProposalPacket type messages.

An integer counter variable, MasterElectionSequenceNum, is used to distinguish messages that are sent by incrementing each time a message is transmitted. Another counter, ReceivedMyMessages keeps track of how many messages that were transmitted by the proposing unit traversed the network and came back. Both counters are initialized to zero. The contents of the received messages are stored in memory spaces called ReceivedMyMessages[Lx], where Lx indicates from which link the messages came. Both memory spaces are initialized to null. A status flag in memory called Master indicates whether a unit is a master unit, where TRUE indicates that it is a master and FALSE indicates that it is not. Initially, the unit's status is FALSE (i.e., it is not considered to be a master unit).

The master election initiation routine discussed above is shown in the pseudo code that follows:

```
StartMasterElection( )
{
MasterElectionSequenceNum++/* initialized to zero at
    the start of process*/
Build MasterProposalPacket with in it
Send MasterProposalPacket via L1
Send MasterProposalPacket via L2
ReceivedMyMessages=0
ReceivedMyMessages[L1]=NULL
ReceivedMyMessages[L2]=NULL
Master=False
}
```

A unit proposing to become a master expects to receive back each MasterProposalPacket message it transmitted through its stacking links. For example, if two messages are transmitted onto to links, L1 and L2, if the unit receives both messages (i.e., one from link L1 and the other from link L2) then it will be considered the master of the stack. If another unit on one of the links determines that the proposing unit should not become a master, it will discard the master proposal packet, prohibiting the proposing unit from receiving back its message. The unit that dropped the message will then send its own master proposal message. Eventually, the master proposal process will converge leaving one unit elected as master. As soon as a unit is elected master of the stack, it transmits a MasterIdentityMessage type message to notify the other units in the stack of its status. A MasterIdentityMessage type packet can forward topology data as well.

Figure 4:
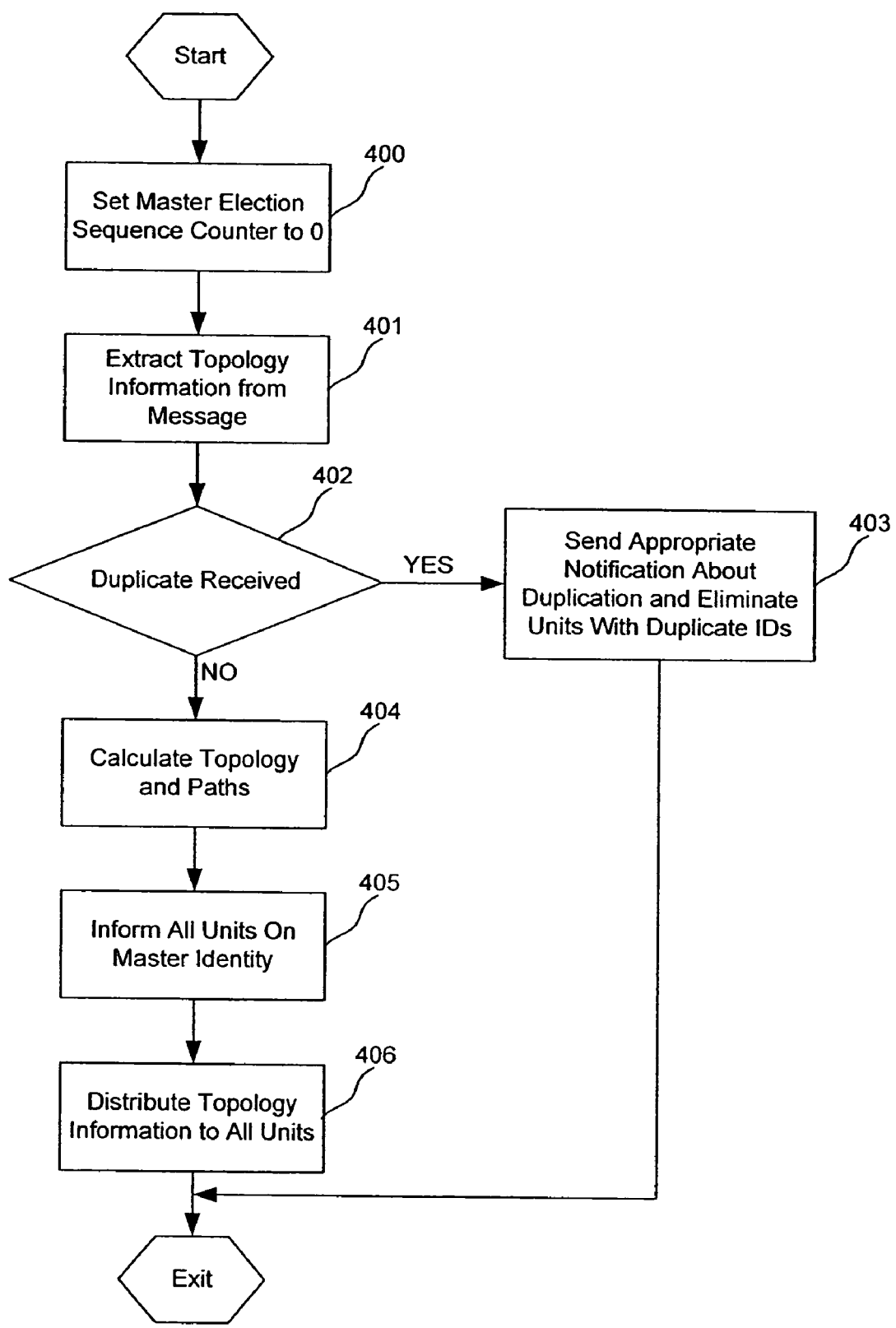
FIG. 4 provides a flowchart of a routine that processes master proposal packets for a unit which has been elected as the master unit.

Referring to FIG. 5, a MasterIdentityMessage type message includes the source unit ID and the sequence number of the message ("Sequence Number"). The message further includes message field "IsMasterEnable" which indicates whether the source unit is master enabled unit and the sequence number of the message indicating the age of the message. A message field "User" (short for User Preference") indicates whether all the other fields that define a unit's ID should be overridden. The value of User Pref message field is set by a user and can be any size (e.g., 1 bit as shown in FIG. 4). A time to live ("TTL") message field is included for use in identifying how much longer the message should exist before being dropped.

Each message a local node handles and decides to forward the following fields are updated: the TTL field, the unit's "topology list length" which indicates the number of topologies the message already contains, a message field indicating whether the message was looped back ("LoopBack").

Figure 3A:
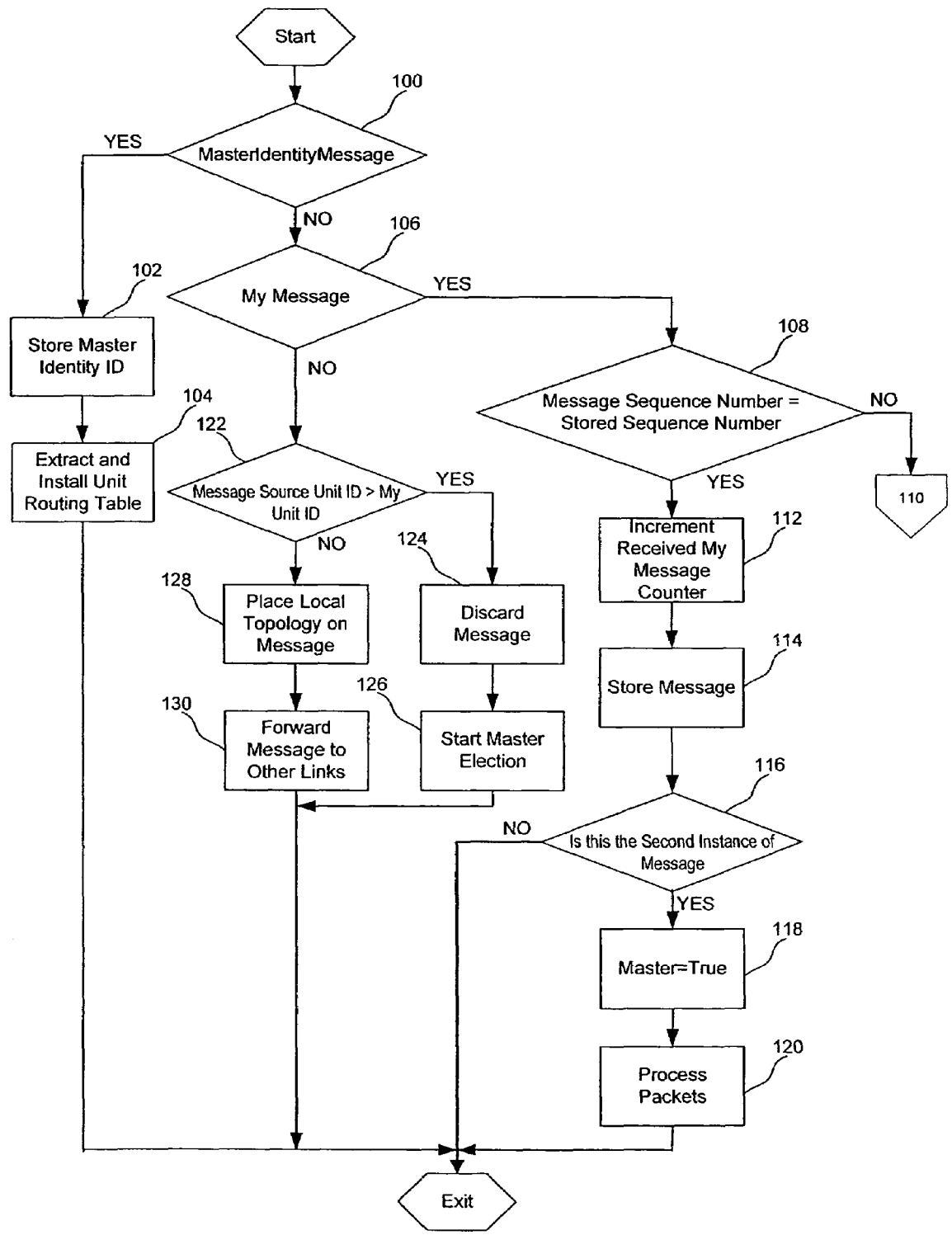
FIGS. 3A and 3B provide a flowchart of how the master election protocol processes message data packets.
Figure 3B:
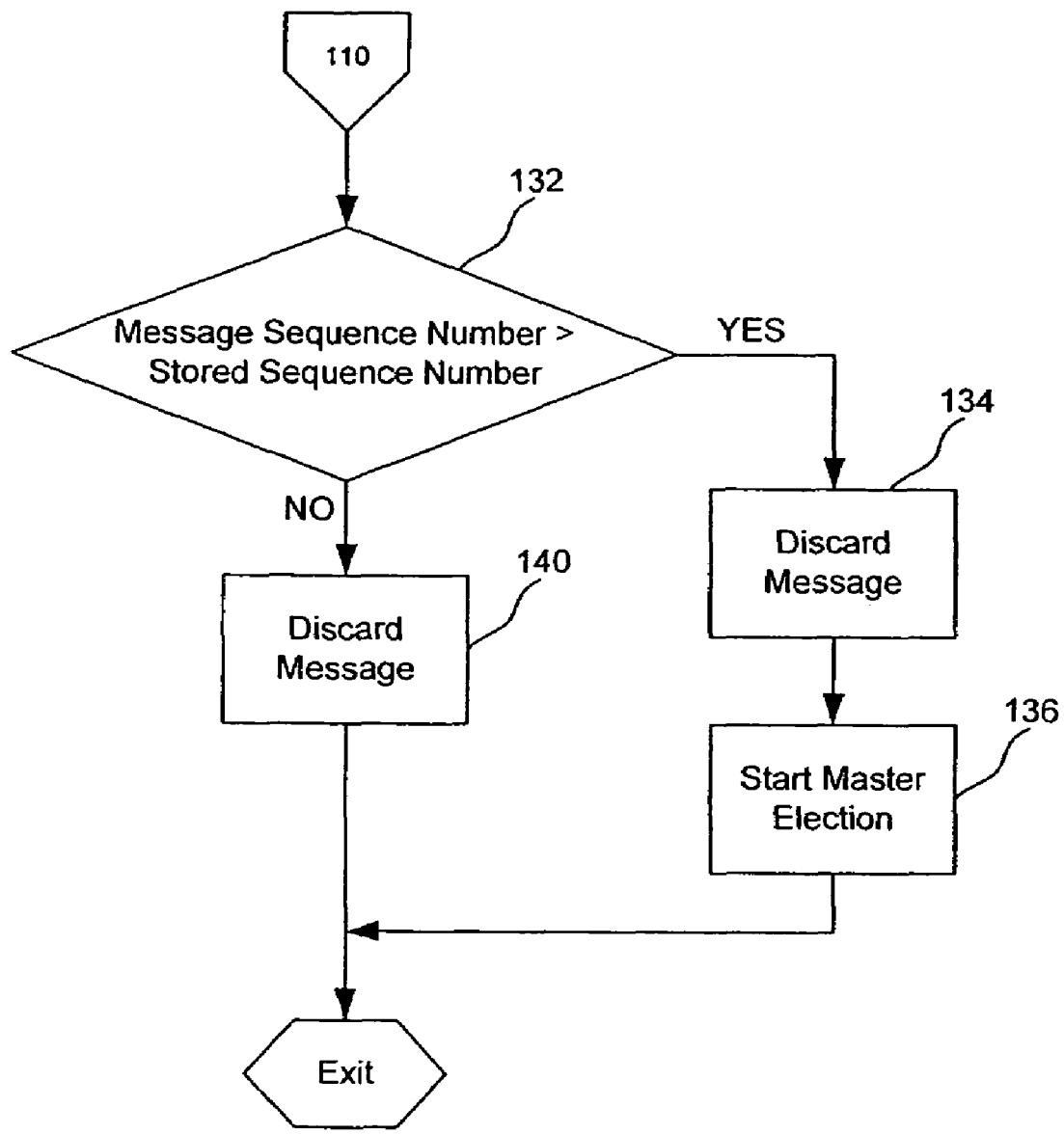

FIGS. 3A and 3B provide a flowchart of how the master election protocol processes message data packets including master proposal packets and master identity packets. Other types of messages can also be received as described in more detail below. As shown in FIG. 3A, if a determination is made in step 100 that a message of type MasterIdentityMessage has been received, then in step 102 the receiving unit stores the UI of the master unit in a memory space (defined in the corresponding pseudo code below as MasterIdentity). In addition, any relevant data such as topology data (e.g., routing tables) can be extracted from the same message as shown in step 104.

If a determination is made in step 100 that the message is not from a master unit, then the message is a master proposal message (i.e., MasterProposalPacket). A determination is made at step 106 whether the message is one of the original proposal messages, MasterProposalPacket, sent by the proposing unit. If so, then a determination is made in step 108 whether the message is newer or older than the master proposal message(s) transmitted by the proposing unit. The determination is based on the message's sequence number and the sequence number stored in the proposing unit. A message with a higher sequence number is newer and one with a lower number is older. If step 108 determines that the message's sequence number is the same as the one in the proposing units memory, the message (i.e., My Message) is the newest proposal message in the stack and counter ReceivedMyMessages is incremented in step 112. In addition, step 114 records the message into a storage space.

If a determination is made at step 116 that the proposing unit has received its second proposal message, then the proposing unit is the new (or revived) master unit. In step 118 the value of Master is set to TRUE to indicate that the proposing unit is now the stack master and any available topology data will be processed as shown in step 120.

If step 108 determines that the sequence numbers are not equal, then step 132 (FIG. 2B) makes a determination whether the message sequence number is greater than the proposing unit's stored sequence number. If a determination is made at step 132 that the message sequence number is greater than the stored sequence number, then the message is discarded and the unit triggers a new master election process, as shown in steps 134 and 136, respectively. If step 132 determines that the message sequence number is less that the proposing unit's stored sequence number, then the message is considered to be an old message from the proposing unit and is discarded, as shown in step 140.

If a determination is made at step 106 that the message is from another unit, then the message's source UI is compared to the proposing unit's stored UI, as shown in step 122. As described above, the unit with the lower UI has higher priority in becoming a master unit. If step 122 determines that the message UI is greater than the proposing unit's stored UI, then the message is discarded, as shown at step 124 and a new master election process is triggered as shown in step 126.

If step 122 determines that the message's source UI is less than the proposing unit's UI then the message's source unit is a better master unit candidate than the proposing unit. In such case, the proposing unit's local topology is placed onto the message in step 128 and in step 130 the source unit's updated message is forwarded to another link (e.g., L1 if the message was received from L2, or vise versa).

Multiple rounds of the protocol above might take place, depending on the number of units in the stack. Eventually, the protocol will converge to find one master unit. In addition, each message can include stack topology information from a database in the unit sending a message, if any.

An example of a message including both a master election message and topology information is shown in FIG. 5. The unit's topology list length indicates the number of topologies the message already contains. Certain message fields indicate the originator of topology information. These are the same fields used to generate a UI. The "Topology Size" message field indicates the size of the unit's topology and topology buffer or "Byte Stream" contains the topology information. The unit that is eventually elected as the master derives stack routing tables from the topology information.

The steps discussed above with respect to FIGS. 3A and 3B are shown in the pseudo code that follows:

```
ProcessMessages(message, L) /* Incoming message "message" from
link "L"*/
{
    If (message.type == MasterIdentityMessage) /* a master was
elected */
    {
        MasterIdentity= message.MasterID
        Extract stack routing table if necessary and install
        Return;
    }
    /* MasterProposalPacket processing */
    If (message==my message)
    {
    /* Check that this message of mine is still relevant (i.e. that there are
    no newer messages running in the stack */
        If (message.MasterElectionSequenceNum = =
MasterElectionSequenceNum)
        {
            ReceivedMyMessages++
            MasterElectionPackets[ReceivedMyMessages]= message
            If (ReceivedMyMessages == 2)
            {
            Master=True
            MasterProc(MasterElectionPackets)
            }
        }
            else if (message.MasterElectionSequenceNum >
        MasterElectionSequenceNum)
            {
    /* The sequence number is reset and newer messages are ignored
    but the sequence number is also incremented and new election
    process initiated; eventually all newer messages will be discarded or
    handled and will converge */
                discard message;
                StartMasterElection ( );
            }
            else discard message; /* one of my old messages which is
            no longer relevant */
    } /* End of my message handling */
    else
    { /* some other unit's message */
        if (message.source_unit_id > my_unit_id)
    /* Discard the received message, but consider it as a trigger for a new
    master election process */
            discard message;
            StartMasterElection ( );
```

```
        else /* Forward message from a better suitable master
candidate */
        {
            Put local unit topology on message;
            if (L == L1)
                forward message via L2
            else
                forward message via L1
        } /* forwarding MasterProposalPacket */
    }
}
```

FIG. 4 is a flowchart of a routine that processes master proposal packets for a unit which has been elected as the master unit. In step 400, a counter, MasterElectionSequenceNum, keeps track of the messages and is initialized to zero. In step 401 the topology information from the received packet is extracted. If a determination is made at step 402 that a duplicate UI was received, then at step 403 the master unit sends a notification message to the redundant unit(s) to stop operating and notifies a user of the duplication(s). In step 404, routing tables and other topology information are calculated. In addition, the master unit informs the other units that it is the master of the stack, as shown at step 405. In step 406, routing tables are distributed to all the stack units.

As discussed above, a topology change triggers the master election protocol. After a master identity message (i.e., MasterIdentityMessage) is transmitted it is followed by the stack routing table the master unit has derived. The master identity message and the stack routing table can also be transmitted as a single message. Any well known network transport mechanism can be used to flood the message(s) to all of the units in the stack.

The steps discussed above with respect to FIG. 4 are shown in the pseudo code that follows:

```
MasterProc(MasterElectionPackets)
{
MasterElectionSequenceNum=0;
Extract topology information from MasterElectionPackets
Eliminate units with duplicate unit-IDs
Calculate topology and paths
Inform all stack units on Master Identity
Distribute routing tables to all stack units
}
```

A master-election protocol message that is sent to a disconnected stacking link is immediately received back from this link, as if there was a neighboring unit on this link that has returned the message. In other words, when a unit sends a message on a link $L_i$ and this link is down, an incoming message will be delivered to the master election application with the incoming link indicated as $L_i$. When messages are delivered to the unit at the end of a chain topology, but the master unit has failed, the message will traverse the stack and then get looped back because the master has not picked-up the message. In order to prevent a message from looping forever (because no master unit exists to process it), when delivering a message to the unit that resides at the end of a chain topology, the message may be marked as "already looped." The message field corresponding to whether the message was looped back is shown as "LoopBack" in FIG. 5. Units at the end of the stack will not loop back the marked message, thereby preventing a message from looping forever.

Another type of message is a "Handling Message TTL." Every protocol message has its own time-to-live (TTL) field as shown in FIG. 5. Upon reception of a message, a unit will decrement the TTL value of the message by 1. When it becomes 0, the unit will drop the message. This prevents old messages from looping in the stack for any reason. If for example, a potential master proposes itself as a master, and then fails, the messages will be removed from the stack using the TTL mechanism. Upon dropping such a message, the unit that has dropped the message starts a new master election process to ensure that a master eventually will be elected.

An optional heartbeat can be used to handle cases in which a unit CPU has failed and its stacking links are still up. An example of a heartbeat mechanism will now be described in more detail. It should be noted, however, that any well known heartbeat mechanisms can be used and still be within the scope of the invention.

Once in K seconds the master can send to both of its outgoing links a heartbeat message. Every unit that receives such a message forwards it on the other stack link (i.e., the link it was not received from). Every potential master can receive this message. In the case K*n seconds have passed and a backup master has not received a heartbeat message, a random timer can be initiated. Preferably, this timer initiates to between 0 to K*n seconds. After the timer expires, the potential master unit starts the master election process. If the potential master unit has received a master election packet while waiting for the timer to expire, it handles the message in accordance with the master election protocol described above and cancels the timer. Without the heartbeat mechanism, neighbors might not notice that a unit has failed. If that were the case, a unit's neighbors would not trigger a master election process.

If a unit is hot inserted, then although a master election will be triggered, the same master will be elected. Thus, in order to prevent the hot insertion of a new unit from disrupting the traffic, slaves that wait for a notification on a master continue forwarding traffic. The slaves wait for a notification on a master since they were notified of a topology change due to hot insertion event. Since the above situation is not distinguishable from when the primary and possibly single master have failed, the slave will continue to forward traffic when the single master in the stack fails.

It may be desirable not to allow slave units forward traffic until a stack master has been elected.

A timer at the slave can be configured to wait for a master to be elected. In case the timeout expires and a master was not notified yet, then the slave stops forwarding messages and puts all its ports in a down status. However, it still continues to wait for a notification on a master in case a new or revived master will become available.

As described above, a master election process is triggered when either a local stack link fails or upon a reception of a master election message. When a topology change occurs, no special topology-change messages are sent across the stack. However, every change will trigger a master election process at the neighboring units to the link that changed its state. The messages sent by these units will be processed as master election messages at every unit and will be considered at the processing units as a topology change notifications. In addition, the messages will trigger at each processing unit a new master election process. Another way to handle topology changes is to announce the changes to all the units and then perform the master election process in order to decide whether the topology change requires a master election.

A single topology change may result in multiple invocations of the master election procedure at more than one unit (i.e., there will be units that will start the master election for a single topology change more than once, and will send more than one set of master election packets). However, the process converges and a single master will be elected. Every master election message set (i.e., the two messages that are sent at each invocation) has a sequence number that is monotonically increasing. Since messages from a particular unit are transmitted on a first-in-first-out (FIFO) basis, a unit that should become a master will process its older messages first and since they are old will discard them. This guarantees that the last message with the biggest sequence number will close the election.

When a stacking link master election packets are received from fails, disconnects or otherwise causes a topology change, Master election packets that were queued and not yet processed preferably are removed and not processed. In case a link fails or reconnects at a slave-only unit, it starts the master election by sending master election messages, but preferably indicates in the message that it is a slave-only message. The first master-enabled unit (either the previous master itself or a backup) that receives such a message will send its own master election messages by starting the master election procedure. A user can be notified when a topology change occurs using well-known trap and system logging (i.e., syslog) tools.

Generally, path calculation algorithms assume a duplication free topology. After topology extraction and before path calculation, all the unit duplications preferably are removed from the topology information. Every unit that is removed from the stack during the master election process can be either shut-down or become a "wire", allowing units that sit on both sides of the wire to see each other as a physical neighbor. If the unit is shut-down then a series of topology changes will occur followed by master election process(es). Eventually, after the removal of all the duplications, the topology will stabilize and the stack will not have any duplications.

Making the duplicate unit behave like a wire prevents the stack from becoming partitioned due to UI duplications. When a unit behaves like a wire as explained above, there is no further complexity in the path and routing table calculations other than issuing a topology change for each unit that becomes a wire and waiting for stack stabilization.

If the hardware does not support the option of forcing a duplicate unit to behave as a physical wire, then switching information on the stack links can be updated in the those duplicate units. Alternatively, a duplicate unit can simply be shut down either automatically upon receipt of a "shut down" message or manually by a user upon notification.

The requirements for choosing which unit of the duplicates to leave and which to terminate are as follows. The "older" unit is preferred over the newer one. The age of a unit is determined in the same way as in the master election algorithm—based on the up time. If two units are of the same age, then the unit which if terminated will have the least effect on the stack topology, will be terminated. If the stack topology is a chain, then the unit that will remain in the stack is the unit which will leave a longer chain. In case of a ring topology, the remain unit will be the one that will leave a more "balanced" chain—where the master is as much as possible in the center of the chain.

In a given session, a unit may send master proposal message more then once due to any local link change or due to an incoming protocol message from a worse candidate unit. For that purpose, the message sequence number is needed. Each two master proposal messages are given a sequence number, and when a unit enters an idle state (i.e., when a master had been elected) the sequence number is set to zero.

Figure 6A:
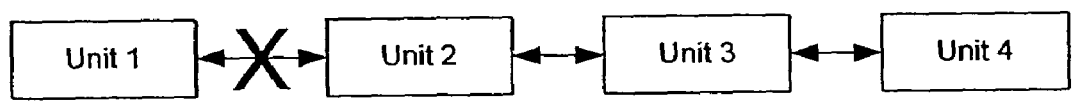
FIGS. 6A-6D are diagrams illustrating a situation where a unit receives a master identifier from a non-existing or failed unit.

FIGS. 6A-6D illustrate a situation where a unit receives a master ID from a non-existing or failed unit. FIG. 6A is a block diagram of four units, where unit 1 was elected as master and has propagated a master identity message (i.e., referred to as MasterIdentityMessage in the pseudo code above). In this scenario unit 1 has shutdown. In accordance with the present invention, unit 2 will detect a link change and start a new master election session. In so doing it will propagate two master proposal messages with sequence number 1 in accordance with the StartMasterElection routine described above.

Figure 6B:
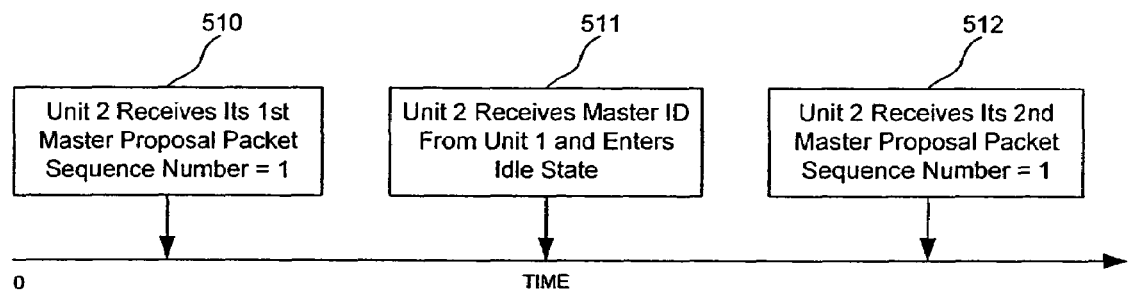

FIG. 6B illustrates one scenario that can happen to unit 2 in the event unit 1 has failed. As step 510 shows, first unit 2 will receive its first master proposal. Unit 2 will keep this message since it has not received any higher priority proposal message. Unit 2 might then receive the master-ID sent from unit 1 before it failed, as shown in step 511. After receiving the proposal message from unit 1, it will enter an idle state since unit 1 was, according to its database, the elected master. Unit 2 will clear its array and set its sequence number counter to 0. Unit 2 might then receive its 2nd master proposal message as shown at step 512. Since it has reset its sequence counter in step 511, now the received message sequence number is higher (i.e., unit 2's sequence number which equals 0, which is less than the message sequence number which equals 1). Unit 2's second message will be dropped and unit 2 will start a new master election session. As discussed above, eventually this new session will converge.

Figure 6C:
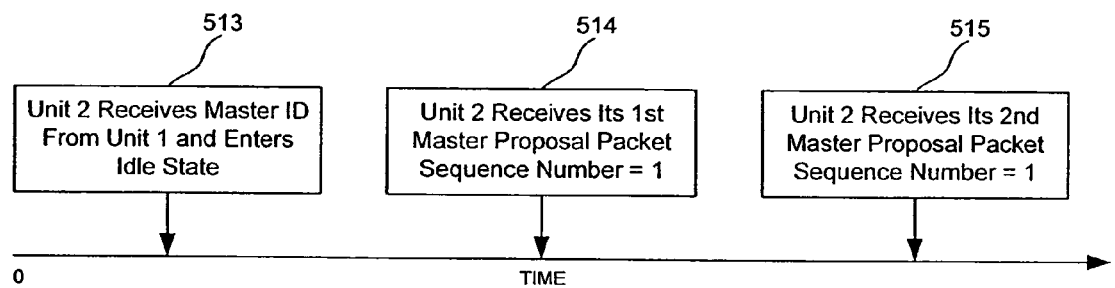

FIG. 6C illustrates another scenario which may occur in the event unit 1 has failed. As shown at step 513, unit 2 might receive a master ID from unit 1 and enter idle state since the message provides that unit 1 is the stack master. After receipt of unit 1's message, unit 2 will set its sequence number to zero. Unit 2 might then receive its first master proposal message, as shown at step 514. At this time unit 2's sequence number is zero which is less than the message sequence number. In this situation, unit 2's first message will be dropped and unit 2 will initiate a new master protocol election session and propagate two new master proposal messages with sequence number equal to 1. Unit 2 might then receive its second original master proposal message. Since the current session is awaiting two new proposal messages, it will keep this message, thinking it is from the current session (i.e., unit 2's current sequence number is 1 which is equal to the message sequence number which equals 1 as well). Eventually, unit 2 will receive one of its last master proposal messages and enter a master-election state and set its sequence number to 0. In this case, eventually the other master proposal will arrive later, and the unit will compare both sequence numbers and start a new master protocol session. Eventually, the new session would converge.

Figure 6D:
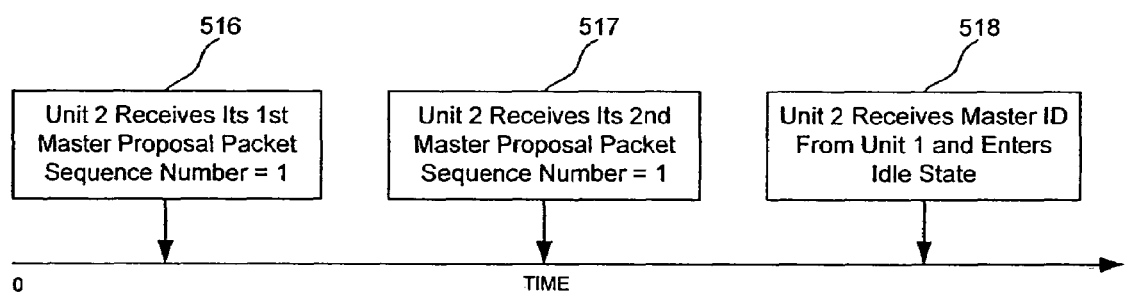
Figure 7:
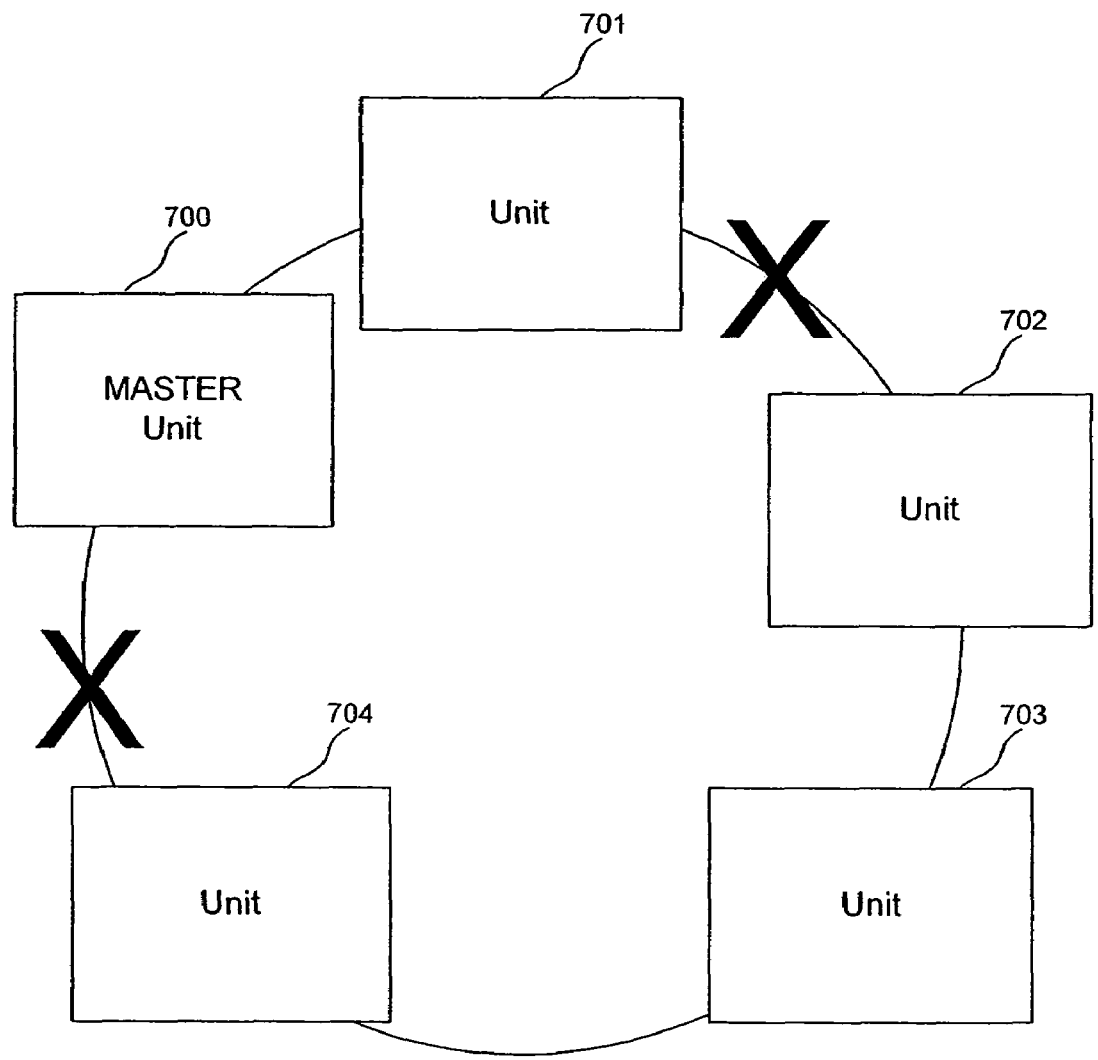
FIG. 7 is a diagram of a ring topology network where the two links are broken between two sets of units.

FIG. 6D illustrates yet another possible scenario that can happen to unit 2 in the event unit 1 has failed. Unit 2 might will receive its first master proposal as shown at step 516. In this situation, unit 2 will store the message. Unit 2 might next also receive its second master proposal message. At this point, since it has received both its messages without any indication that another unit is in fact a master, unit 2 will enter the master state and propagate its master identity message. Then unit two will remain idle and expect only master election proposal messages and not master Id messages. If unit 2 receives the master identity message from unit 1 it will start a new master election session. Unit 2's proposal messages will eventually pass through the stack and cause unit 2 to be elected as the new master.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The invention claimed is:

1. A method for electing a master unit from a plurality of candidate units on a ring or chain topology network, comprising the steps of:
    transmitting from one of the candidate units a plurality of master proposal data packets onto a plurality of stacking links communicatively coupled to the network;
    receiving on the one candidate unit at least one message data packet; and
    electing the one candidate unit as the master unit if the one candidate unit receives a plurality of message data packets corresponding to the plurality of transmitted master proposal data packets.

2. A method according to claim 1, further comprising the steps of:
    extracting from the received message data packet topology information; and
    updating a topology database on the one candidate unit with the topology information extracted from the received message data packet.

3. A method according to claim 2, further comprising the steps of:
    building an information packet including updated topology information from the one candidate unit's updated topology database and an identifier identifying the master unit; and
    transmitting the information packet onto the network.

4. A method according to claim 3, wherein the identifier includes at least one arbitrary and/or at least one dynamic variable, wherein the arbitrary variable is static and the dynamic variable changes over time.

5. A method according to claim 3, wherein the identifier identifying the master unit includes the value of a user preference variable, an up time variable, a physical unit identifier and/or a hardware unit identifier stored on the master unit.

6. A method according to claim 1, further comprising the step of:
    updating a topology database on the one candidate unit with updated topology information extracted from at least one of the master proposal data packets;
    building a master identity packet including the topology information stored in the one candidate unit's topology database and an identifier identifying the one candidate unit as the master unit; and
    transmitting onto the network the master identity packet.

7. A method according to claim 6, wherein the identifier identifying the one candidate unit includes the value of a user preference variable, an up time variable, a physical unit identifier and/or a hardware unit identifier stored on the one candidate unit.

8. A method according to claim 1, further comprising the steps of:
    extracting a unit identifier from the received message data packet; and
    discarding the received message data packet if the identifier of the one candidate unit is less than the unit identifier extracted from the received message data packet.

9. A method according to claim 8, wherein the unit identifier includes the value of a user preference variable, an up time variable, a physical unit identifier and/or a hardware unit identifier stored on a unit supplying the message data packet.

10. A method according to claim 9, wherein the identifier of the one candidate unit is less than the unit identifier when:

a user preference variable of the one candidate unit is greater than the user preference variable of the unit identifier.

11. A method according to claim 9, wherein the identifier of the one candidate unit is less than the unit identifier when:
   a user preference variable of the one candidate unit is equal to the user preference variable of the unit identifier and an up time variable of the one candidate unit is greater than the up time of the unit identifier.

12. A method according to claim 9, wherein the identifier of the one candidate unit is less than the unit identifier when:
   a user preference variable of the one candidate unit is equal to the user preference variable of the unit identifier, an up time variable of the one candidate unit is greater than the up time variable of the unit identifier, and a physical unit identifier of the one candidate unit is less than the physical unit identifier of the unit identifier.

13. A method according to claim 9, wherein the identifier of the one candidate unit is less than the unit identifier when:
   a user preference variable of the one candidate unit is equal to the user preference variable of the unit identifier, an up time variable of the one candidate unit is greater than the up time variable of the unit identifier, a physical unit identifier of the one candidate unit is equal to the physical unit identifier of the unit identifier, and a hardware unit identifier of the one candidate unit is equal to the hardware unit identifier of the unit identifier.

14. A method according to claim 1, further comprising the steps of:
   extracting a message sequence number from the received message data packet;
   comparing a message sequence number stored on the one candidate unit to the message sequence number; and
   discarding the received message data packet if the one candidate unit's stored message sequence number is greater than or less than the message sequence number.

15. A method according to claim 1, further comprising the steps of:
   extracting a message sequence number from the received message data packet;
   comparing a message sequence number stored on the one candidate unit to the extracted message sequence number;
   incrementing a counter if the one candidate's stored message sequence number is equal to the extracted message sequence number;
   updating a topology database on the one candidate unit with updated topology information extracted from the master proposal data packet if the value of the counter equals the number of master proposal data packets transmitted onto the network by the one candidate;
   building a master identity packet including the topology information stored in the one candidate unit's topology database and an identifier identifying one candidate unit as the master unit; and
   transmitting onto the network the master identity packet.

16. A method according to claim 1 wherein the transmitting step is triggered by a change in a topology of the network.

17. A method according to claim 1 further comprising the steps of:
   receiving a request to initiate a master election process message; and
   wherein the transmitting step is triggered upon receiving the request to initiate a master election process message.

18. A method according to claim 1, further comprising the steps of:
   including marking information in the plurality of transmitted master proposal data packets; and
   preventing one of the transmitted plurality of master proposal data packets from endlessly looping within the network by recognizing the marking information and discarding at least one of the transmitted packets.

19. A method according to claim 1, further comprising the steps of:
   including a time to live field in the plurality of master proposal data packets;
   initializing the time to live field with a predetermined value; and
   decrementing the time to live field; and
   preventing one of the master proposal data packets from endlessly looping within the network by discarding the packet when the time to live field is lower than another predetermined value.

20. A network device on a ring or chain topology network, comprising:
   a packet processor adapted to transmit a plurality of master proposal data packets onto a plurality of stacking links communicatively coupled to the network and to receive at least one message data packet; and
   a control unit adapted to control the packet processor and to elect the device as a master unit if the packet processor receives a plurality of message data packets corresponding to the plurality of transmitted master proposal data packets.

21. A network device according to claim 20, further comprising:
   a topology database adapted to store topology information;
   wherein the control unit is further adapted to extract from the message data packet topology information and update the topology database with the topology information extracted from the message data packet.

22. A network device according to claim 21, wherein the control unit is further adapted to build an information packet including updated topology information from the topology database and an identifier identifying the network device as a master unit, and wherein the packet processor is further adapted to transmit the information packet onto the network.

23. A network device according to claim 22, wherein the identifier includes at least one arbitrary and/or at least one dynamic variable, wherein the arbitrary variable is static and the dynamic variable changes over time.

24. A network device according to claim 22, wherein the identifier includes the value of a user preference variable, an up time variable, a physical unit identifier and/or a hardware unit identifier stored on the master unit.

25. A network device according to claim 20, further comprising:
   a topology database adapted to store topology information, and
   wherein the control unit is further adapted to update the topology database with updated topology information extracted from at least one of the master proposal data packets and build a master identity packet including the topology information stored in the topology database and a master unit identifier identifying the network device as the master unit, and
   wherein the packet processor is further adapted to transmit onto the network the master identity packet.

26. A network device according to claim 25, wherein the identifier includes the value of a user preference variable, an up time variable, a physical unit identifier and/or a hardware unit identifier stored on the one candidate unit.

27. A network device according to claim 20, further comprising:
- a memory adapted to store an identifier of the network device, and
- wherein the control unit is further adapted to extract a unit identifier from the received message data packet, and discard the received message data packet if the identifier stored in the memory is less than the unit identifier extracted from the received message.

28. A network device according to claim 27, wherein the unit identifier includes the value of a user preference variable, an up time variable, a physical unit identifier and/or a hardware unit identifier stored on a unit supplying the message data packet.

29. A network device according to claim 28, wherein the identifier of the device is less than the unit identifier when:
- a user preference variable stored in the memory is greater than the user preference variable of the unit identifier from the received message data packet.

30. A network device according to claim 28, wherein the identifier of the one candidate unit is less than the unit identifier when:
- a user preference variable of the network device is equal to the user preference variable of the extracted unit identifier and an up time variable of the network device is greater than the up time of the extracted unit identifier.

31. A network device according to claim 28, wherein the identifier of the network device is less than the unit identifier when:
- a user preference variable of the network device is equal to the user preference variable of the extracted unit identifier, an up time variable of the network device is greater than the up time variable of the extracted unit identifier, and a physical unit identifier of the network device is less than the physical unit identifier of the extracted unit identifier.

32. A network device according to claim 28, wherein the identifier of the network device is less than the unit identifier when:
- a user preference variable of the network device is equal to the user preference variable of the extracted unit identifier, an up time variable of the network device is greater than the up time variable of the extracted unit identifier, a physical unit identifier of the network device is equal to the physical unit identifier of the extracted unit identifier, and a hardware unit identifier of the network device is equal to the hardware unit identifier of the extracted unit identifier.

33. A network device according to claim 20, further comprising:
- wherein the control unit is further adapted to extract a message sequence number from the received message data packet, compare a message sequence number of the transmitted plurality of master proposal packets to the extracted message sequence number, and discard the received message data packet if the message sequence number of the transmitted plurality of master proposal packets is greater than or less than the extracted message sequence number.

34. A network device according to claim 20, further comprising:
- a topology database adapted to store topology information, wherein the control unit is further adapted to extract a message sequence number from the message data packet, compare a message sequence number of the transmitted plurality of master proposal packets to the extracted message sequence number, increment a counter if the message sequence number of the transmitted plurality of master proposal packets is equal to the extracted message sequence number, update the topology database with updated topology information extracted from the master proposal data packet if the value of the counter equals the number of master proposal data packets transmitted onto the network by the packet processor, build a master identity packet including the topology information stored in the topology database and an identifier identifying the network device as the master unit, and
- wherein the packet processor is further adapted to transmit onto the network the master identity packet.

35. A network device according to claim 20, wherein the control unit is further adapted to trigger the packet processor to transmit the plurality of master proposal data packets upon detecting a change in a topology of the network.

36. A network device according to claim 20, wherein the packet processor is further adapted to receive a request to initiate a master election process message and to transmit upon receiving the request to initiate a master election process message.

37. A network device according to claim 20, wherein the packet processor is further adapted to mark the plurality of transmitted master proposal data packets and prevent one of the transmitted plurality of master proposal data packets from endlessly looping within the network by recognizing the mark and discarding at least one of the transmitted packets.

38. A network device according to claim 20, wherein the packet processor is further adapted to include a time to live field in the plurality of master proposal data packets, initialize the time to live field with a predetermined value, decrement the time to live field, and prevent one of the master proposal data packets from endlessly looping within the network by discarding the packet when the time to live field is lower than another predetermined value.

39. An apparatus for electing a master unit from a plurality of candidate units on a ring or chain topology network, comprising:
- means for transmitting from one of the candidate units a plurality of master proposal data packets onto a plurality of stacking links communicatively coupled to the network;
- means for receiving on the one candidate unit at least one message data packet; and
- means for electing the one candidate unit as the master unit if the one candidate unit receives a plurality of message data packets corresponding to the plurality of transmitted master proposal data packets.

40. An apparatus according to claim 39, further comprising:
- means for extracting from the received message data packet topology information; and
- means for updating a topology database on the one candidate unit with the topology information extracted from the received message data packet.

41. An apparatus according to claim 40, further comprising:
- means for building an information packet including updated topology information from the one candidate unit's updated topology database and an identifier identifying the master unit; and
- means for transmitting the information packet onto the network.

42. An apparatus according to claim 41, wherein the identifier includes at least one arbitrary and/or at least one dynamic variable, wherein the arbitrary variable is static and the dynamic variable changes over time.

43. An apparatus according to claim 41, wherein the identifier identifying the master unit comprises the value of a user preference variable, an up time variable, a physical unit identifier and/or a hardware unit identifier stored on the master unit.

44. An apparatus according to claim 39, further comprising:
means for updating a topology database on the one candidate unit with updated topology information extracted from at least one of the master proposal data packets;
means for building a master identity packet including the topology information stored in the one candidate unit's topology database and an identifier identifying the one candidate unit as the master unit; and
means for transmitting onto the network the master identity packet.

45. An apparatus according to claim 44, wherein the identifier identifying the one candidate unit comprises the value of a user preference variable, an up time variable, a physical unit identifier and/or a hardware unit identifier stored on the one candidate unit.

46. An apparatus according to claim 39, further comprising:
means for extracting a unit identifier from the received message data packet; and
means for discarding the received message data packet if the identifier of the one candidate unit is less than the unit identifier.

47. An apparatus according to claim 46, wherein the unit identifier includes the value of a user preference variable, an up time variable, a physical unit identifier and/or a hardware unit identifier stored on a unit supplying the message data packet.

48. An apparatus according to claim 47, wherein the identifier of the one candidate unit is less than the unit identifier when:
a user preference variable of the one candidate unit is greater than the user preference variable of the unit identifier.

49. An apparatus according to claim 47, wherein the identifier of the one candidate unit is less than the unit identifier when:
a user preference variable of the one candidate unit is equal to the user preference variable of the unit identifier and an up time variable of the one candidate unit is greater than the up time of the unit identifier.

50. An apparatus according to claim 47, wherein the identifier of the one candidate unit is less than the unit identifier when:
a user preference variable of the one candidate unit is equal to the user preference variable of the unit identifier, an up time variable of the one candidate unit is greater than the up time variable of the unit identifier, and a physical unit identifier of the one candidate unit is less than the physical unit identifier of the unit identifier.

51. An apparatus according to claim 47, wherein the identifier of the one candidate unit is less than the unit identifier when:
a user preference variable of the one candidate unit is equal to the user preference variable of the unit identifier, an up time variable of the one candidate unit is greater than the up time variable of the unit identifier, a physical unit identifier of the one candidate unit is equal to the physical unit identifier of the unit identifier, and a hardware unit identifier of the one candidate unit is equal to the hardware unit identifier of the unit identifier.

52. An apparatus according to claim 39, further comprising:
means for extracting a message sequence number from the received message data packet;
means for comparing a message sequence number stored on the one candidate unit to the extracted message sequence number; and
means for discarding the received message data packet if the one candidate unit's stored message sequence number is greater than or less than the extracted message sequence number.

53. An apparatus according to claim 39, further comprising:
means for extracting a message sequence number from the received message data packet;
means for comparing a message sequence number stored on the one candidate unit to the extracted message sequence number;
means for incrementing a counter if the one candidate's stored message sequence number is equal to the extracted message sequence number;
means for updating a topology database on the one candidate unit with updated topology information extracted from the master proposal data packet if the value of the counter equals the number of master proposal data packets transmitted onto the network by the one candidate;
means for building a master identity packet including the topology information stored in the one candidate unit's topology database and an identifier identifying one candidate unit as the master unit; and
means for transmitting onto the network the master identity packet.

54. An apparatus according to claim 39, further comprising:
means for triggering the means for transmitting by a change in the topology of the network.

55. An apparatus according to claim 39 further comprising:
means for receiving a request to initiate a master election process message; and
wherein the means for transmitting is triggered upon receiving the request to initiate a master election process message.

56. An apparatus according to claim 39, further comprising:
means for including marking information in the plurality of transmitted master proposal data packets; and
means for preventing one of the transmitted plurality of master proposal data packets from endlessly looping within the network by recognizing the marking information and discarding at least one of the transmitted packets.

57. An apparatus according to claim 39, further comprising:
means for including a time to live field in the plurality of master proposal data packets;
means for initializing the time to live field with a predetermined value; and
means for decrementing the time to live field; and
means for preventing one of the master proposal data packets from endlessly looping within the network by discarding the packet when the time to live field is lower than another predetermined value.

58. An apparatus for initiating a process for electing a master unit from a plurality of candidate units on a ring or chain topology network, comprising:

means for receiving on one of the candidate units a message data packet;

means for extracting a unit identifier from the message data packet;

means for discarding the message data packet if the unit identifier is not equal to an identifier stored on the one candidate unit;

means for building a plurality of master proposal data packets including topology information from the one candidate unit and an identifier identifying the one candidate; and means for transmitting onto the network the plurality of master proposal data packets.

59. A system of stacked units on a ring or chain topology network, comprising:

a candidate unit adapted to transmit a plurality of master proposal data packets onto a plurality of stacking links communicatively coupled to the network and to receive at least one message data packet, and wherein the candidate unit elects itself as a master unit if it receives a plurality of message data packets corresponding to the plurality of transmitted master proposal data packets.

60. A system according to claim 59, wherein the candidate unit is further adapted to extract from the received message data packet topology information, and update a topology database on the candidate unit with the topology information extracted from the received message data packet.

61. A system according to claim 60, where the candidate unit is further adapted to build an information packet including updated topology information from the candidate unit's updated topology database and an identifier identifying a master unit, and transmit the information packet onto the network.

62. A system according to claim 61, wherein the identifier includes at least one arbitrary and/or at least one dynamic variable, wherein the arbitrary variable is static and the dynamic variable changes over time.

63. A system according to claim 61, wherein the identifier identifying the master unit includes the value of a user preference variable, an up time variable, a physical unit identifier and/or a hardware unit identifier stored on the master unit.

64. A system according to claim 59, wherein the candidate unit is further adapted to update a topology database on the candidate unit with updated topology information extracted from at least one of the master proposal data packets, build a master identity packet including the topology information stored in the candidate unit's topology database and an identifier identifying the candidate unit as the master unit, and transmit onto the network the master identity packet.

65. A system according to claim 64, wherein the identifier identifying the candidate unit includes the value of a user preference variable, an up time variable, a physical unit identifier and/or a hardware unit identifier stored on the candidate unit.

66. A system according to claim 59, wherein the candidate unit is further adapted to extract a unit identifier from the received message data packet and discard the received message data packet if the identifier of the candidate unit is less than the unit identifier extracted from the received message data packet.

67. A system according to claim 66, wherein the unit identifier includes the value of a user preference variable, an up time variable, a physical unit identifier and/or a hardware unit identifier stored on a unit supplying the message data packet.

68. A system according to claim 67, wherein the identifier of the candidate unit is less than the unit identifier of a second candidate unit when:

a user preference variable of the candidate unit is greater than the user preference variable of the unit identifier of the second candidate unit.

69. A system according to claim 67, wherein the identifier of the candidate unit is less than the unit identifier of a second candidate unit when:

a user preference variable of the candidate unit is equal to the user preference variable of the unit identifier of the second candidate unit and an up time variable of the candidate unit is greater than the up time of the unit identifier of the second candidate unit.

70. A system according to claim 67, wherein the identifier of the candidate unit is less than the unit identifier of a second candidate unit when:

a user preference variable of the candidate unit is equal to the user preference variable of the unit identifier of the second candidate unit, an up time variable of the candidate unit is greater than the up time variable of the unit identifier of the second candidate unit, and a physical unit identifier of the candidate unit is less than the physical unit identifier of the unit identifier of the second candidate unit.

71. A system according to claim 67, wherein the identifier of the candidate unit is less than the unit identifier of a second candidate unit when:

a user preference variable of the candidate unit is equal to the user preference variable of the unit identifier of the second candidate unit, an up time variable of the candidate unit is greater than the up time variable of the unit identifier of the second candidate unit, a physical unit identifier of the candidate unit is equal to the physical unit identifier of the unit identifier of the second candidate unit, and a hardware unit identifier of the candidate unit is equal to the hardware unit identifier of the unit identifier of the second candidate unit.

72. A system according to claim 59, wherein the candidate unit is further adapted to extract a message sequence number from the received message data packet, compare a message sequence number stored on the unit to the extracted message sequence number, and discard the received message data packet if the candidate unit's stored message sequence number is greater than or less than the extracted message sequence number.

73. A system according to claim 59, wherein the candidate unit is further adapted to extract a message sequence number from the received message data packet, compare a message sequence number stored on the candidate unit to the extracted message sequence number, increment a counter if the one candidate's stored message sequence number is equal to the extracted message sequence number, update a topology database on the candidate unit with updated topology information extracted from the master proposal data packet if the value of the counter equals the number of master proposal data packets transmitted onto the network by the candidate, build a master identity packet including the topology information stored in the candidate unit's topology database and an identifier identifying the candidate unit as the master unit, and transmit onto the network the master identity packet.

74. A system according to claim 59, wherein the candidate unit is further adapted to detect a change in a topology of the network.

75. A system according to claim 59, wherein the candidate unit is further adapted to receive a request to initiate a master election process message and transmit a plurality of master proposal data packets upon receiving the request to initiate a master election process message.

76. A system according to claim 59, wherein the candidate unit is further adapted to include marking information in the plurality of transmitted master proposal data packets, and wherein another unit prevents the transmitted plurality of master proposal data packets from endlessly looping within the network by recognizing the marking information and discarding at least one of the transmitted packets.

77. A system according to claim 59, wherein the candidate unit is further adapted to include a time to live field in the plurality of master proposal data packets, wherein the time to live field is initialized with a predetermined value, and wherein at least one of the stacked units in the network is adapted to decrement the time to live field, and prevent one of the master proposal data packets from endlessly looping within the network by discarding the packet when the time to live field is lower than another predetermined value.

78. A system of stacked units on a ring or chain topology network, comprising:
means for transmitting a plurality of master proposal data packets onto a plurality of stacking links communicatively coupled to the network;
means for receiving at least one message data packet; and
means for electing a master unit if the means for transmitting receives a plurality of message data packets corresponding to the plurality of transmitted master proposal data packets.

79. A system according to claim 78, further comprising:
means for extracting from the received message data packet topology information; and
means for updating a topology database with the topology information extracted from the received message data packet.

80. A system according to claim 79, further comprising:
means for building an information packet including updated topology information from the updated topology database and an identifier identifying a master unit; and
means for transmitting the information packet onto the network.

81. A system according to claim 80, wherein the identifier includes at least one arbitrary and/or at least one dynamic variable, wherein the arbitrary variable is static and the dynamic variable changes over time.

82. A system according to claim 80, wherein the identifier includes the value of a user preference variable, an up time variable, a physical unit identifier and/or a hardware unit identifier stored on the master unit.

83. A system according to claim 78, further comprising:
means for updating a topology database with updated topology information extracted from at least one of the master proposal data packets;
means for building a master identity packet including the topology information stored in the topology database and an identifier identifying the master unit; and
means for transmitting onto the network the master identity packet.

84. A system according to claim 83, wherein the identifier includes the value of a user preference variable, an up time variable, a physical unit identifier and/or a hardware unit identifier.

85. A system according to claim 78, further comprising:
means for extracting a unit identifier from the received message data packet; and means for discarding the received message data packet if the identifier of a candidate unit is less than the identifier extracted from the received message data packet.

86. A system according to claim 85, wherein the identifier includes the value of a user preference variable, an up time variable, a physical unit identifier and/or a hardware unit identifier stored on a unit supplying the message data packet.

87. A system according to claim 78, further comprising:
means for extracting a message sequence number from the received message data packet;
means for comparing a stored message sequence number to the extracted message sequence number; and
means for discarding the received message data packet if the stored message sequence number is greater than or less than the extracted message sequence number.

88. A system according to claim 78, further comprising:
means for extracting a message sequence number from the received message data packet;
means for comparing a stored message sequence number to the extracted message sequence number;
means for incrementing a counter if the stored message sequence number is equal to the extracted message sequence number;
means for updating a topology database with updated topology information extracted from the master proposal data packet if the value of the counter equals the number of master proposal data packets transmitted onto the network;
means for building a master identity packet including the topology information stored in the topology database and an identifier identifying the master unit; and
means for transmitting onto the network the master identity packet.

89. A system according to claim 78, further comprising:
means for detecting a change in a topology of the network.

90. A system according to claim 78, further comprising:
means for receiving a request to initiate a master election process message; and
means for transmitting a plurality of master proposal data packets upon receiving the request to initiate a master election process message.

91. A system according to claim 78, further comprising:
means for including marking information in the plurality of transmitted master proposal data packets; and
means for preventing the transmitted plurality of master proposal data packets from endlessly looping within the network by recognizing the marking information and discarding at least one of the transmitted packets.

92. A system according to claim 78, further comprising:
means for including a time to live field in the plurality of master proposal data packets;
means for initializing the time to live field with a predetermined value;
means for decrementing the time to live field; and
means for preventing one of the master proposal data packets from endlessly looping within the network by discarding the packet when the time to live field is lower than another predetermined value.

93. A system according to claim 78, further comprising:
means for determining an identifier of a first candidate unit is less than a unit identifier of a second candidate.

* * * * *